United States Patent
Vitullo et al.

(10) Patent No.: US 12,292,600 B2
(45) Date of Patent: May 6, 2025

(54) CONTROL OF RESONANT OPTICAL EVANESCENT COUPLING BETWEEN WAVEGUIDES AND RESONATORS

(71) Applicant: U.S. Army DEVCOM, Army Research Laboratory, Adelphi, MD (US)

(72) Inventors: Dashiell L. Vitullo, Rockville, MD (US); Daniel E. Jones, Nottingham, MD (US); Michael Brodsky, Millburn, NJ (US); Michael Sumetsky, Birmingham (GB); Sajid Zaki, Birmingham (GB)

(73) Assignee: The United States of America as represented by the Secretary of the Army, Washington, DC (US)

( * ) Notice: Subject to any disclaimer, the term of this patent is extended or adjusted under 35 U.S.C. 154(b) by 209 days.

(21) Appl. No.: 17/890,626

(22) Filed: Aug. 18, 2022

(65) Prior Publication Data

US 2022/0390677 A1    Dec. 8, 2022

Related U.S. Application Data

(60) Provisional application No. 63/234,258, filed on Mar. 2, 2024.

(51) Int. Cl.
*G02B 6/293* (2006.01)

(52) U.S. Cl.
CPC ................... *G02B 6/29341* (2013.01)

(58) Field of Classification Search
CPC ............ G02B 6/29335; G02B 6/29338; G02B 6/29341
See application file for complete search history.

(56) References Cited

U.S. PATENT DOCUMENTS

2012/0213474 A1 *   8/2012   DiGiovanni ......... G02B 6/4201
                                                    385/30

FOREIGN PATENT DOCUMENTS

CN        108871200 A   *  11/2018
CN        109631961 A   *   4/2019

OTHER PUBLICATIONS

M. Sumetsky. Theory of SNAP devices: basic equations and comparison with experiment. Optics Letters, 20:20:22537-22554, Sep. 24, 2012 (https://doi.org/10.1364/OE.20.022537) (Year: 2012).*
Vahala, "Optical Microcavities," Nature, vol. 424, (6950), pp. 839-846, Aug. 14, 2003.
Righini et al., "Whispering gallery mode microresonators: Fundamentals and applications", Riv Nuovo Cimento, vol. 34, No. 7, pp. 435-488, 2011.

(Continued)

*Primary Examiner* — Michael Stahl
(74) *Attorney, Agent, or Firm* — Alan I. Kalb

(57) ABSTRACT

Various embodiments are directed to systems, apparatus and methods for characterizing evanescent coupling parameters of a waveguide coupled to a resonator through variation of their relative positions. Various embodiments extend a local coupling approach with novel fitting capabilities that robustly determine the bare resonator modes and coupling parameters with quantified residual error and coupling parameter uncertainty estimates.

20 Claims, 6 Drawing Sheets

(56) References Cited

OTHER PUBLICATIONS

Jiang et al., "Chaos-assisted broadband momentum transformation in optical microresonators", Science, vol. 358, (6361), pp. 344-347, Oct. 20, 2017.
Lei et al., "Polarization-controlled cavity input-output relations", Phys. Rev. Lett., vol. 124, No. 10, 103902, 2020.
Acharyya et al., "Multiple Critical Couplings and Sensing in a Microresonator-Waveguide System", Phys. Rev. Appl., vol. 8, No. 3, 034029, 2017.
(Reference typo corrected) Little et al;., "Analytic Theory of Coupling from Tapered Fibers and Half-Blocks into Microsphere Resonators", J. Lightwave Technol., vol. 17, No. 4, pp. 704-715, Apr. 1999.
Gorodetsky et al., "Optical microsphere resonators: optimal coupling to high-Q whispering-gallery modes", J. Opt. Soc. Am. B, vol. 16, No. 1, pp. 147-154, Jan. 1999.
Cai et al., "Observation of Critical Coupling in a Fiber Taper to a Silica-Microsphere Whispering-Gallery Mode System", Phys. Rev. Lett., vol. 85, No. 1, pp. 74-77, Jul. 3, 2000.
Spillane et al., Vahala, "Ideality in a Fiber-Taper-Coupled Microresonator System for Application to Cavity Quantum Electrodynamics", Phys. Rev. Lett., vol. 91, No. 4, 043902, Jul. 25, 2003.
Humphrey et al., "Calculation of optimal fiber radius and whispering-gallery mode spectra for a fiber-coupled microsphere", Opt. Commun., vol. 271, No. 1, pp. 124-131, 2007.
Zou et al., "Taper-microsphere coupling with numerical calculation of coupled-mode theory", J. Opt. Soc. Am. B, vol. 25, Np. 11, pp. 1895-1898, Nov. 2008.
Chiasera et al., "Spherical whispering-gallery-mode microresonators", Laser Photonics Rev., vol. 4, No. 3, pp. 457-482, 2010.
Gorajoobi et al., "Design of rare-earth-doped microbottle lasers", Opt. Express, vol. 26, No. 20, pp. 26339-36354, Oct. 1, 2018.
Kimble, H.J., "The quantum internet", Nature, vol. 453, (7198), pp. 1023-1030, Jun. 19, 2008.
Volz et al., "Nonlinear Π phase shift for single fibre-guided photons interacting with a single resonator-enhanced atom", Nat. Photonics, vol. 8, No. 12, pp. 965-970, Dec. 2014.
Reiserer et al., "Cavity-based quantum networks with single atoms and optical photons", Rev. Mod. Phys., vol. 87, No. 4, pp. 1379-1418, Oct.-Dec. 2015.
Yariv, A., "Universal relations for coupling of optical power between microresonators and dielectric waveguides", Electron. Lett., vol. 36, No. 4, pp. 321-322, Feb. 17, 2000.
Sumetsky, M., "Theory of SNAP devices: basic equations and comparison with the experiment", Opt. Express, vol. 20, No. 20, p. 22537-22554, Sep. 24, 2012.
Sumetsky, M., "Delay of Light in an Optical Bottle Resonator with Nanoscale Radius Variation: Dispersionless, Broadband, and Low Loss", Phys. Rev. Lett., vol. 111, No. 16, 163901, Oct. 18, 2013.
Sumetsky, M., "Microscopic optical buffering in a harmonic potential", Sci. Rep., vol. 5, No. 1, 18569. 2016.
Suchkov et al., "Frequency comb generation in SNAP bottle resonators", Opt. Lett., vol. 42, No. 11, pp. 2149-2152, Jun. 1, 2017.
Sumetsky et al., "Surface nanoscale axial photonics", Opt. Express, vol. 19, No. 27, pp. 26470-26485, Dec. 19, 2011.
Sumetsky, M., "Nanophotonics of optical fibers", Nanophotonics, vol. 2, No. (5-6), pp. 393-406, 2013.
Ding et al., "Ultralow loss single-mode silica tapers manufactured by a microheater", Appl. Opt., vol. 49, No. 13, pp. 2441-2445, May 1, 2010.
Crespo-Ballesteros et al., "Four-port SNAP microresonator device", Opt. Lett., vol. 44, No. 14, pp. 3498-3501, Jul. 15, 2019.
Sumetsky, M., "A SNAP coupled microresonator delay line", Opt. Express, vol. 21, No. 13, pp. 15268-15279, Jlu. 1, 2013.
Sumetsky et al., "Probing optical microfiber nonuniformities at nanoscale", Opt. Lett., vol. 31, No. 16, pp. 2393-2395, Aug. 15, 2006.
Colombe et al., "Strong atom-field coupling for Bose-Einstein condensates in an optical cavity on a chip", Nature, vol. 450, (7167), pp. 272-276, Nov. 8, 2007.

* cited by examiner

CONTROL OF RESONANT OPTICAL EVANESCENT COUPLING BETWEEN WAVEGUIDES AND RESONATORS

CROSS-REFERENCE TO RELATED APPLICATION

This application claims priority to U.S. Provisional Patent Application No. 63/234,258, filed on Aug. 18, 2021 and entitled Control Of Resonant Optical Evanescent Coupling Between Waveguides And Resonators Via Axial Positioning, which application is incorporated herein by reference in its entirety.

GOVERNMENT INTEREST

The invention described herein may be manufactured and used by or for the Government of the United States for all governmental purposes without the payment of any royalty.

FIELD OF THE DISCLOSURE

The present disclosure relates generally to photonics, more particularly, to modelling and optimization of waveguide/resonator coupling.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Optical communication technologies form the backbone of modern information networks. Microresonators coupled to optical fiber networks with tapered optical fibers have a wide variety of potential applications in serving as devices that store light (optical buffers), direct light (optical switching, routing, or circulation), and manipulating the state of light (delay lines or nonlinear optical frequency converters). A major challenge to developing these devices is minimization of loss, in which light ends up somewhere other than where it is intended to go.

SUMMARY OF THE INVENTION

Various deficiencies in the prior art are addressed below by the disclosed systems, methods and apparatus configured for characterizing evanescent coupling parameters of a waveguide (WG) coupled to a resonator through variation of their relative positions. Various embodiments extend a local coupling approach with novel fitting capabilities that robustly determine the bare resonator modes and coupling parameters with quantified residual error and coupling parameter uncertainty estimates.

One embodiment comprises a method of determining evanescent coupling parameters of a waveguide coupled to a resonator, the waveguide configured to provide a field having a length scale w that is smaller than a characteristic length $x_c$ of a field of the resonator, the method comprising: responsive to data indicative of a Jones matrix spectrum of the coupled waveguide and resonator at each of multiple contact positions x along the resonator with fixed z, calculating a transmission spectrum of the coupled waveguide and resonator at each of the multiple contact positions x; generating a 2D spectrogram by combining the calculated transmission spectrum of the coupled waveguide and resonator at each of the multiple contact positions x; estimating resonator parameters by fitting a resonator model to a 1D axial resonance spectrum derived from the 2D spectrogram; and fitting a coupled WG/resonator model to a subset of 2D spectrogram data to estimate coupling parameters using estimated resonator parameters.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
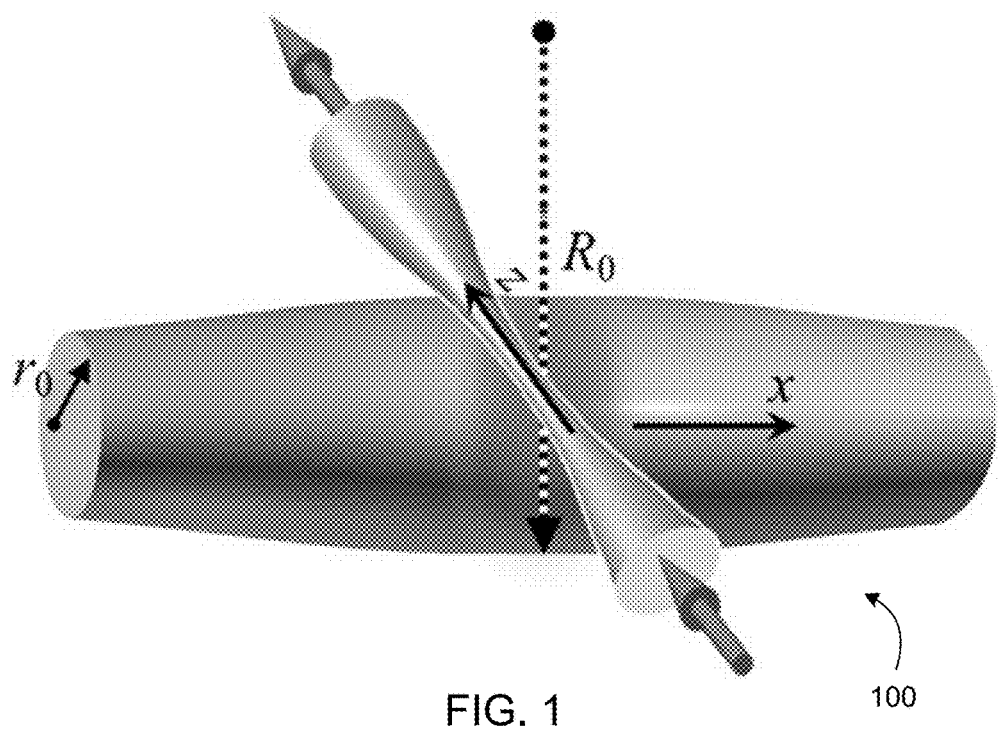
FIG. 1 is an illustration of an elongated bottle microresonator coupled to a tapered optical fiber with micron-scale diameter (microfiber)

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Photonic devices based on optical microresonators typically include waveguides (WGs), which are used to couple light in and out of microresonators. The performance of these devices is determined by the intrinsic optical characteristics of the microresonators and waveguides as well as by the coupling between them. The theoretical and experimental investigation of microresonators with different shapes (rings, spheres, toroids, bottles, etc.) is of great current interest and has been intensively developed for different applications. While recent studies have identified promising novel coupling designs, less attention has been given to investigating exactly how coupling performance depends upon the optical and geometric characteristics of waveguides and microresonators. These dependencies are quite complex and in many cases it is easier to determine them experimentally. However, understanding the fundamental features of coupling between waveguides and microresonators, especially of those with three-dimensional geometry (e.g., microspheres and microbottles), is important for the future development of resonant microdevices for classical and quantum applications.

Evanescent coupling between tapered fibers and whispering gallery modes (WGMs) is ultimately concerned with overlap integrals of the taper and resonator fields. Typical coupling characterization focuses on quantities such as the transmission, roundtrip loss, and coupling strength, or ideality. Determination of these parameters and/or other parameters of interest may indicate when parasitic losses are minimized, but does not provide details about the underlying loss processes.

A local coupling approach may be applied in the regime where the characteristic transverse length scale of the waveguide (WG) field w is small compared to the characteristic longitudinal variation length $x_c$ of the resonator field When $w \ll x_c$, the waveguide-microresonator coupling may be approximately determined using the local value of the WGM microresonator field at the waveguide position.

It is noted that the assumption of a "local condition" being satisfied such by $x_c$ being ~at least an order of magnitude greater than w is not a bright line assumption; rather, this is a reasonable estimate of when the local condition is satisfied. Further, it is noted that the assumption that $w \ll x_c$ justifies the approximation of the coupling as happening at a single location in the x direction, and that this assumption is relevant to the particular illustrative embodiment. However, this is not the case for all or even most evanescent coupling situations. When the condition is violated such that the underlying rationale for the condition is no longer operative (e.g., the local condition is not satisfied), then the coupling parameters are no longer independent of the resonator mode distribution. As such, modifications to the embodiments are contemplated by the inventors so as to adapt to such conditions.

The local coupling approach/approximation simplifies the overlap integral, enabling separation of coupling parameters from the resonator field modes. Characterization of these parameters as the coupling configuration is varied enables insight into the underlying coupling and scattering processes. For example, resonant and non-resonant loss are described by separate parameters, thus yielding more insight into how to ameliorate loss than is afforded with a single loss parameter.

The various embodiments extend the local coupling approach with novel fitting capabilities that robustly determine the bare resonator modes and coupling parameters with quantified residual error and coupling parameter uncertainty estimates. We report the first characterization of the profile of these coupling parameters along the longitudinal axis of a tapered optical fiber. The procedure demonstrated herein maps the entire menu of coupling configurations available via transverse positioning of the taper along the longitudinal axis of the resonator, enabling subsequent selection of the desired coupling. Lastly, we report a novel quantification of the "criticality bound" that indicates how to determine the coupling regime (undercoupled, critically coupled, or overcoupled) from the coupling parameters.

The various embodiments described herein generally contemplate that the WG and resonator are in physical contact. They need not be in physical contact, though they do need to be optically coupled (i.e., overlap of the respective evanescent fields with sufficient strength so as to operate substantially in the manner described herein). For example, they may be ~100 nm from each other (air gap, other medium, vacuum, etc. as is known). Therefore, the various claim limitations are not to be construed as excluding WG/resonator pairs where the devices are optically cooperating with each other substantially as described herein.

Microresonator-based optical devices depend upon the ability to control coupling of light into and out of a resonator via one or more waveguides. The various embodiments address a number of problems associated with controlling such coupling. Specifically, the various embodiments provide systems and methodology for characterization and control of said resonator-waveguide coupling to one or more waveguides. This is accomplished via characterization of the coupling parameters followed by subsequent precise positioning of the waveguide(s) and resonator to achieve the desired coupling conditions.

The characterization technique of the embodiments uses resonator models and fitting algorithms to robustly determine the coupling parameters from measured data, which enables selection of specific known coupling conditions. Subsequent positioning sets the central frequency and linewidth of resonant coupling, along with the coupling strength and loss.

In an exemplary WG/resonator pair, characterization of the resonant optical coupling properties is accomplished by positioning a microtaper along the long axis of a resonator. This characterization reveals for a given WG/resonator pair a number of possible options, and subsequent positioning thereof allows selection of resonance spectra with particular coupling strength, loss, and resonance shape. This approach allows selective coupling where light through the taper is strongly coupled to some resonator modes while being simultaneously near-zero for other resonator modes. The approach of various embodiments is reconfigurable, and allows a user to optimize coupling for their application.

The disclosed fitting algorithms enable rapid and robust characterization of the coupling strength, phase, and both resonant and nonresonant loss. This microresonator technology works in the regime where the axial resonator mode is large compared to the taper, which enables coupling control by positioning. This model, using solutions to the one-dimensional Schrödinger equation with fitting algorithms, is substantially different from the approaches commonly used to characterize coupling between microresonators and tapered fibers.

The measurement information may be derived while, for example, an WG/resonator pair are arranged in a fixed position z (e.g., an initial or first WG taper axis position z such as noted with respect to FIG. 1) with respect to each other and providing evanescent coupling there between. The measurement information may be derived while the WG/resonator pair are arranged in a movable manner with respect to each other, allowing physical translation of the WG and resonator with respect to each other such that measurement information may be derived at each of a number of WG/resonator positions providing evanescent coupling there between.

Given an individual spectrogram derived using measurements, it is desired to determine therefrom the coupling parameters and the resonator parameters. It is noted that the parameters of a resonator are relatively static in a clean environment; once the parameters of a particular resonator have been characterized they do not necessarily need to be recharacterized. However, varying parameters associated with the coupling itself will result in different coupling parameters. For example, it is desirable for the resonator and waveguide to be disposed within a clean environment since dirt and water-mediated damage can accumulate and degrade coupling therebetween.

A first step is to find the resonator parameters. If they have previously been determined with respect to a particular axial mode series for a particular resonator, then the step does not need to be repeated. A second step is to find the coupling parameters. Once the coupling parameters and resonator parameters are characterized, the particular applications may comprise any useful application, such as with respect to classical light filtering or quantum entanglement and so on.

Various embodiments are directed to enabling efficient or at least loss-appropriate coupling between waveguides and resonators. That is, a waveguide (able to translate light to resonators and other devices) are coupled to a resonator (able to circulate light therewithin) using evanescent coupling therebetween so that light may be coupled into and out of the resonator. In particular, to determine such a coupling in accordance with a desired application, the various embodiments characterize a proposed waveguide/resonator coupling arrangement to extract characterizing parameters therefrom. The characterizing parameters comprise a set of mathematical values and variables that describe the coupling between the waveguide and the resonator.

Various embodiments contemplate the use of a waveguide (illustratively but not limited to a tapered optical waveguide) that is small (e.g., cross section) when compared to the extent of the resonator modes of the resonator, and moving this WG across the resonator to make a map of the modes of the resonator so as to determine from the characterizing parameters associated with each of the various WG/resonator coupling configurations the respective coupling parameters. A fitting mechanism is used to analyze the characterizing parameters and related data, and the problem space associated with this analysis is reduced by efficiently selecting specific subsets of data to be analyzed (i.e., not all the data).

Various embodiments provide a method for determining local coupling parameters in all coupling regimes and demonstrate their characterization along a microfiber waveguide coupled to an elongated bottle microresonator. The method may comprise a numerical-fitting-based method for experimental determination of the local coupling parameters in all coupling regimes and may demonstrate their characterization along a microfiber waveguide coupled to an elongated bottle microresonator.

Illustrative Example

FIG. 1 is an illustration of an elongated bottle microresonator coupled to a tapered optical fiber with micron-scale diameter (microfiber). The specific resonator and waveguide depicted in FIG. 1 are provided for illustrative purposes only, since the various embodiments are applicable to different types of resonators, different types of waveguides, and many/various couplings therebetween, such as discussed herein.

Referring to FIG. 1, the whispering gallery modes (WGMs, or whispering gallery waves [WGWs]) in a bottle microresonator such as depicted therein are related to $R_0$ and $r_0$ are the axial and radial radii of curvature, respectively. The fundamental WGM in this resonator behaves as $\exp[im\phi]\exp(-x^2/x_c^2)$ where m is the azimuthal quantum number and $x_c = (2R_0 r_0)^{1/4} \lambda_{res}^{1/2} (2\pi n_e)^{-1/2}$ with resonance wavelength $\lambda_{res}$, effective refractive index $n_e$, and axial and radial radii of curvature $R_0$ and $r_0$, respectively.

Using $R_0$=30 m and $r_0$=19 μm, the resulting $x_c$=75 μm, which is significantly greater than the diameter of microfiber w~1 μm, thereby satisfying the local coupling condition.

The coupling is changed by moving one of the devices (WG or resonator) relative to the other to vary the contact point or coupling position of the WG (e.g., the microfiber) and the resonator (e.g., the bottle microresonator) to provide one or more coupling positions for measurement. That is, 3D spatial translation of the WG and resonator with respect to each other is used to physically arrange the devices in accordance with one or more positions of interest, including positions enabling optical coupling therebetween, so that relevant measurements may be taken of various optical properties at each of the positions. The relevant measurement data is then processed in accordance with the embodiments as described herein.

In order to correctly ascertain the coupling parameters, it is important to identify the optical transfer characteristics of the device under test (DUT) in the polarization basis of the resonator modes. In some embodiments, the configuration is manually adjusted to ensure that light used to perform characterizing measurements is in said basis, but it is simpler to use numerical optimization techniques to determine the basis from raw polarization-diverse transmission measurements.

In some embodiments, the relevant measurement data associated with a WG/resonator pair is provided by manual or automatic apparatus enabling such physical translation of the WG and resonator pair to the one or more positions of interest, such that test instrumentation may be used to measure the optical characteristics of the WG/resonator pair at each of the positions of interest.

In some embodiments, relevant measurement data associated with a WG/resonator pair is received from a source of such information (e.g., a remote measuring lab, a data storage site storing prior measurement results, etc.), and the received relevant measurement data is then further processed in accordance with the various embodiments.

For the exemplary type of WG/resonator pair, the coupling therebetween depends on the local diameter of the taper at the contact point along its longitudinal axis z, as well as the position of the contact point along the resonator's longitudinal axis x. Setting z=0 when the resonator is aligned for contact in the center of the taper waist region, and x=0 when the taper is aligned for contact with the center of the resonator. The range of the effective radius variation $\Delta r_{\it eff}(x)$ describing the bottle microresonator used in our experiment is very small (nanoscale); therefore, the resonant transmission power through the microfiber is described by the following:

$$P(\lambda, x, z) = \left| S_0(z) - \frac{i|C(z)|^2 G(\lambda, x, x)}{1 + D(z)G(\lambda, x, x)} \right|^2, \quad (1)$$

where $\lambda$ is the vacuum wavelength. Here $S_0(z)$, $|C(z)|^2$ and $D(z)$ are the local coupling parameters, which depend on neither x nor the cavity mode (interpretations detailed below). $G(\lambda,x,x)$ is the Green's function of the one-dimensional wave equation describing the propagation of WGMs along the bottle axis x:

$$\frac{\partial^2 \Psi}{\partial x^2} + \beta^2(\lambda, x)\Psi = 0. \quad (2)$$

Here $$\beta(\lambda, x) = 2^{1/2}\beta_0 \left[ \left(\frac{\Delta r_{\it eff}(x)}{r_0}\right) - \left(\frac{\Delta \lambda}{\lambda_{res}}\right) \right]^{1/2}$$

is the WGM propagation constant, $$\beta_0 = \frac{2\pi n}{\lambda_{res}}$$

is the propagation constant in the bulk resonator material with refractive index n, and $\Delta\lambda$ is the wavelength variation.

The interpretations of the local coupling parameters in Eq. (1) are as follows: $|C|^2$ is the coupling strength between resonator and taper modes. $|S_0|$ describes the field transmission through the taper in the absence of coupling to resonator modes ($|C|^2 \to 0$). $|S_0|^2$ is the power transmission for light with nonresonant wavelength [where $G(\lambda,x,x) \approx 0$]. Transmission of resonant light depends on a coherent combination of the terms and exhibits Fano line-shapes, and the phase arg($S_0$) controls the spectral shape of the resonances. The presence of the dielectric tapered fiber in the evanescent resonator field changes the field distribution relative to the condition where it is absent. D describes these effects and relates the bare Green's function describing the resonator mode field in the absence of the taper $G(\lambda,x,x)$ to the renormalized (dressed) Green's function with the taper present $$\bar{G}(\lambda, x, x) = \frac{G(\lambda, x, x)}{1 + D(z)G(\lambda, x, x)}.$$

Re(D) describes the shift of the resonance wavelength induced by the tapers presence (coupling to the taper changes the optical path length). Finally, Im(D) describes broadening of the resonances due to additional loss induced by the presence of the microfiber (e.g. via coupling to radiation modes). It is noted that there can be "$M_{tapers}$" tapers, where M is >1.

It is noted that the various embodiments are useful for waveguide/resonator combinations other the combination depicted in FIG. 1. Depending on the waveguide/resonator combination of interest, the application, and so on—there are different coupling conditions of interest. There are three coupling regimes: undercoupled, critically coupled, and overcoupled. As an example, it may be desirable to set up the waveguide with respect to the resonator in a critically coupled configuration such that there is interference operative to stop all of the light that would transmit through the waveguide and past the resonator.

Experimental Characterization

Figure 2A:
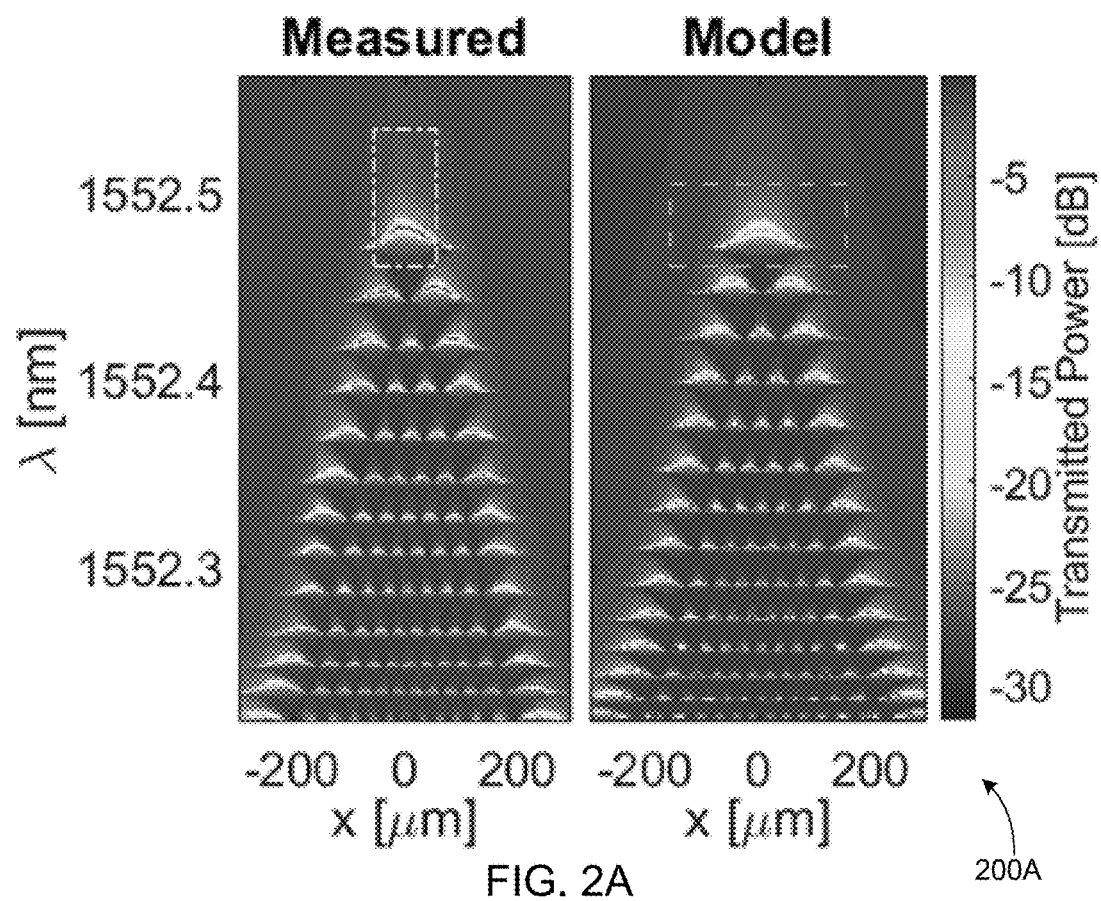
FIG. 2A depicts 2D measured and best-fit model spectrograms, near critical coupling, showing multiple axial modes of the WG/resonator of FIG. 1.

FIG. 2A depicts 2D measured and best-fit model spectrograms, near critical coupling, showing multiple axial modes of the WG/resonator of FIG. 1.

Referring to FIG. 2A, the dot-dashed box over the measured data spectrogram indicates the region used in coupling parameter fitting. The dashed box over the model spectrogram indicates the magnified region shown in FIG. 2B, which compares the measured and best-fit model fundamental axial mode. FIG. 2C depicts a comparison of measured and best-fit model fundamental resonances at z=−2.5 mm in the overcoupled regime. The characteristic edge dips seen in this regime are indicated with arrows on the measured data.

An experimental system used by the inventors comprised an elongated SNAP bottle microresonator with ~400 μm extent along x, created on 38 μm diameter fiber using a $CO_2$ laser, coupled to a microfiber pulled using a ceramic microheater.

Coupling parameters were estimated through the measurement and analysis of 2D spectrograms, such as depicted with respect to FIG. 2A. The depicted spectrograms were formed by combining the transmission spectrum through the microfiber at multiple contact positions x along the resonator with an initial or first fixed z. The transmission spectrum is calculated from the Jones matrix spectrum of the system, measured with a Luna Technologies Optical Vector Analyzer (OVA). Isolating the Jones matrix describing transmission past the microresonator from those describing the taper segments and connecting fibers may be accomplished using several techniques. From this, the reported transmission values may be calculated, which are for light with polarization matched to the resonator modes. The baseline taper loss (spectral average of 4.6 dB) is removed such that transmitted power fraction is 0 dB (no loss) in the absence of coupling.

In various embodiments, rather than using only one fixed WG/resonator position z, the measurement information taken at multiple points of interest x may be iteratively derived for each of multiple fixed WG/resonator positions z (e.g., $z_1$, $z_2$, and so on) of the WG/resonator pair. The operation of the various embodiments are described herein primarily with respect to a single fixed WG/resonator positions z, however these embodiments may be modified to include iterative x-dimension measurements for each of multiple z-dimension WG/resonator positions (e.g., $z_1$ through $z_3$). That is, in addition to multiple positions x for a fixed z, further measurement data may be associated with multiple positions x for each of one or more additional fixed z such that the measurement data is derived by iterating multiple positions x (one dimension) over each of multiple fixed WG/resonator positions z (another dimension). In the exemplary WG/resonator of FIG. 1, changes in position along the z-axis result in differing radii of the taper at the point of contact with the resonator.

It is noted that calculating the transmission spectrum from the Jones matrix yields a result similar to aligning the polarization basis and directly measuring transmission without ever calculating a Jones matrix spectrum. Specifically, assuming that the fibers connecting the OVA to the WG/resonator are lossless, the Jones matrices describing the propagation along these fibers will be unitary within a constant scalar factor. Then, within a constant factor, the measured Jones matrix $J_{meas}(\lambda)$ can be expressed through the diagonalized Jones matrix of the SBMR $J_{SBMR}(\lambda)$ (transforming its TE and TM polarization states), as $J_{meas}(\lambda)=U_{out} J_{SBMR}(\lambda)U_{in}$, where $U_{in}$ and $U_{out}$ are 2×2 unitary matrices that account for the field transformation in the input and output of the OVA, optical fibers, as well as the unitary transformation of the SBMR to the diagonal form representing the transformation of its polarization states. Since $U_{in}$ and $U_{out}$ are unitary matrices, the latter equation may be rearranged to obtain $J_{SBMR}(\lambda)=U_{out}^\dagger J_{meas}(\lambda)U_{in}^\dagger$. Unitary matrices $U_{in}^\dagger$ and $U_{out}^\dagger$ contain seven free parameters which are determined by minimizing the off-diagonal elements of $J_{SBMR}(\lambda)$. The diagonal elements of the determined $J_{SBMR}(\lambda)$ are the transmission amplitude for each polarization state (TE or TM). These parameters do not noticeably change with the wavelength, and remain constant, if the physical properties of the input-output fibers and environment remain unaltered. (M. Crespo-Ballesteros, Y. Yang, N. Toropov, and M. Sumetsky, "Four-port SNAP microresonator device," Opt. Lett. 44(14), 3499 (2019)).

The data indicative of Jones matrix spectrum of the coupled waveguide and resonator is limited to a subset of the multiple contact positions and wavelengths, the subset being defined to include positions between the characteristic edge-dips present in the overcoupling regime and a wavelength (equivalently frequency) range that includes the fundamental axial resonance without including additional axial resonances.

Further, fitting procedures with a sufficiently refined resonator mode model may in some embodiments use a different fit region. Device stability, device type, spectroscopic resolution, and/or other factors are relevant to the selection of fit region, fitting procedure, and so on as will be appreciated by one skilled in the art and informed by the teaching of this specification.

Next, the embodiments fit the measured spectrogram data to extract the best-fit coupling parameters. To accomplish this, embodiments first find the Green's function solution to the 1D wave equation of Eq. (2). The effective radius variation serves as a potential of the assumed form:

$$\Delta r_{eff}(x) = A\exp\left[-\left(\frac{(x-x_0)^2}{2\sigma^2}\right)^p\right] + K. \quad (3)$$

Mode solving hardware/software modules, such as may be executed via the computing device discussed below with respect to FIG. 5, may take the potential function with specified resonator parameters A, σ, p, $x_0$, and K as an input and returns the bare Green's functions $G(\lambda,x,x)$ describing the resonator modes in the absence of any coupled waveguides.

It is important to note that Eq. 3 expresses a function form for a particular resonator; namely, the exemplary microresonator used to illustrate the embodiments. As is well known to those skilled in the art, there are many types and/or shapes of resonators and each of these has associated with it a respective functional form which may be expressed via a respective equation. The various embodiments are broadly applicable to these many resonator types and/or shapes. As such, and as will be appreciated by those skilled in the art, when using a different type/shape resonator (i.e., different than the exemplary microresonator), the discussions herein are modified by using the equation(s) expressing the functional form of the different type/shape resonator rather than the eq. 3 expression of the functional form of the exemplary microresonator.

Next, the embodiments use a fitting procedure to find the values of the resonator parameters A, σ, p and K that produce a modal eigenwavelength spectrum that best matches the observed spectrum. The best-fit values of A=3.2744 nm, σ=123.5934 µm, and p=1.1406 are used for all spectrograms considered in the Optics Express publication, while $x_0$ and K are set for each spectrogram therein to account for the angle between the x and z axes being slightly different from 90°, and for random spectral shifts arising from thermal drift, respectively. The measured spectrograms are then fit to Eq. (1) using the bare Green's functions $G(\lambda,x,x)$ found for each spectrogram. The fits are performed in the region indicated in the dashed box in FIG. 2A (and described below with respect to Eq. (5)) with fixed $G(\lambda,x,x)$ to find the 5 (illustratively, see discussion below) best-fit real-valued local coupling parameters: $|S_0(z)|^2$, $\arg[S_0(z)]$, $|C(z)|^2$, $Re[D(z)]$, and $Im[D(z)]$, in addition to the final minimized "cost" value (described below; not a coupling parameter). Each spectrogram measurement is repeated 4 times (illustratively, more or fewer may be used) to assess repeatability, and the profile of the mean average values for these parameters and the associated cost values (detailed below) are plotted in FIGS. 3A-3D, with the error bars showing the standard deviation of each quantity.

The various embodiments contemplate the use of five real-valued coupling parameters for each individual waveguide. It is noted that the number of coupling parameters should be correctly matched to the WG/resonator configuration, that the coupling parameters should be operationally representative of the WG/resonator coupling, and that the coupling parameters should be presented and utilized in a functional form operative to provide a sufficiently accurate representation of the WG/resonator coupling so that the corresponding WG/resonator model is as accurate as possible. Further, the various embodiments contemplate four repetitions, which number was selected by the inventors as good balance of runtime and repeatability. A different number of repetitions may be used.

With respect to FIGS. 3A-3D, depicted therein are various results associated with average coupling parameters with error bars showing standard deviation. z indicates the position along the taper axis of resonator-taper contact, with z=0 corresponding to resonator contact at the center of the taper waist region.

Figure 3A:
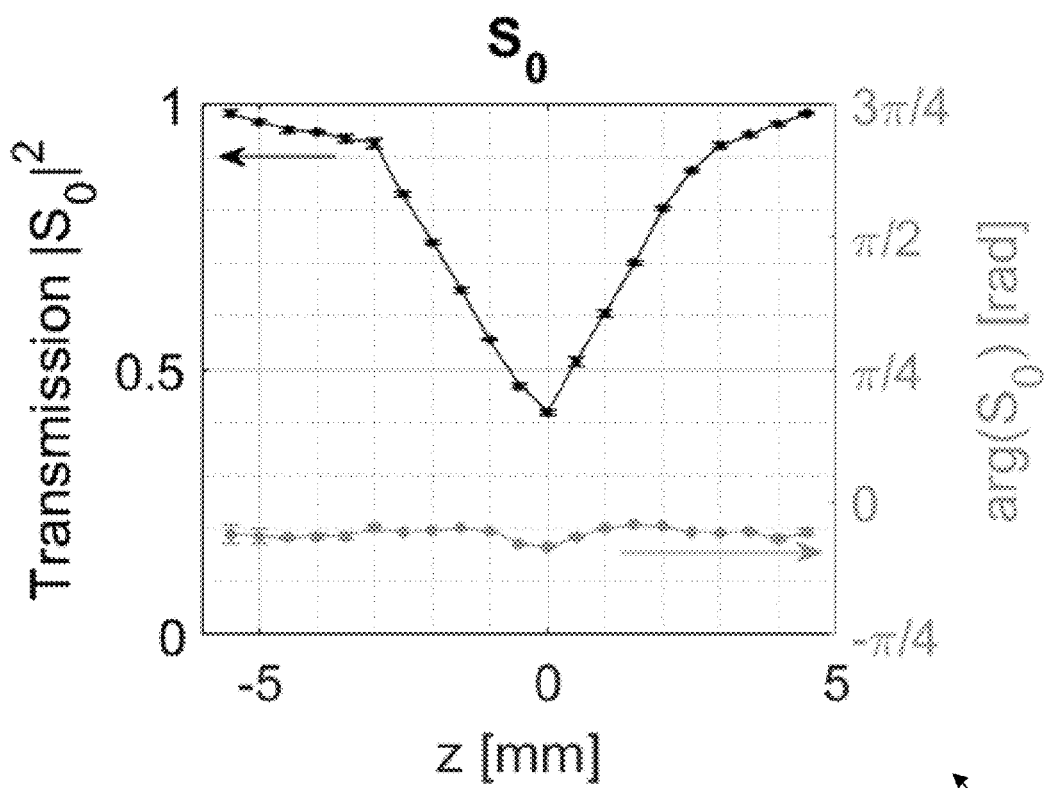
FIG. 3A graphically depicts both non-resonant transmission power amplitude and phase coupling parameters as a function of WG taper axis position z for a WG/resonator system as illustrated in FIG. 1.

FIG. 3A graphically depicts non-resonant transmission power amplitude as a function of WG taper axis position z, specifically $|S_0|^2$ as a function of WG taper axis position z (upper plot), with phase profile $\arg(S_0)$ (lower plot).

Figure 3B:
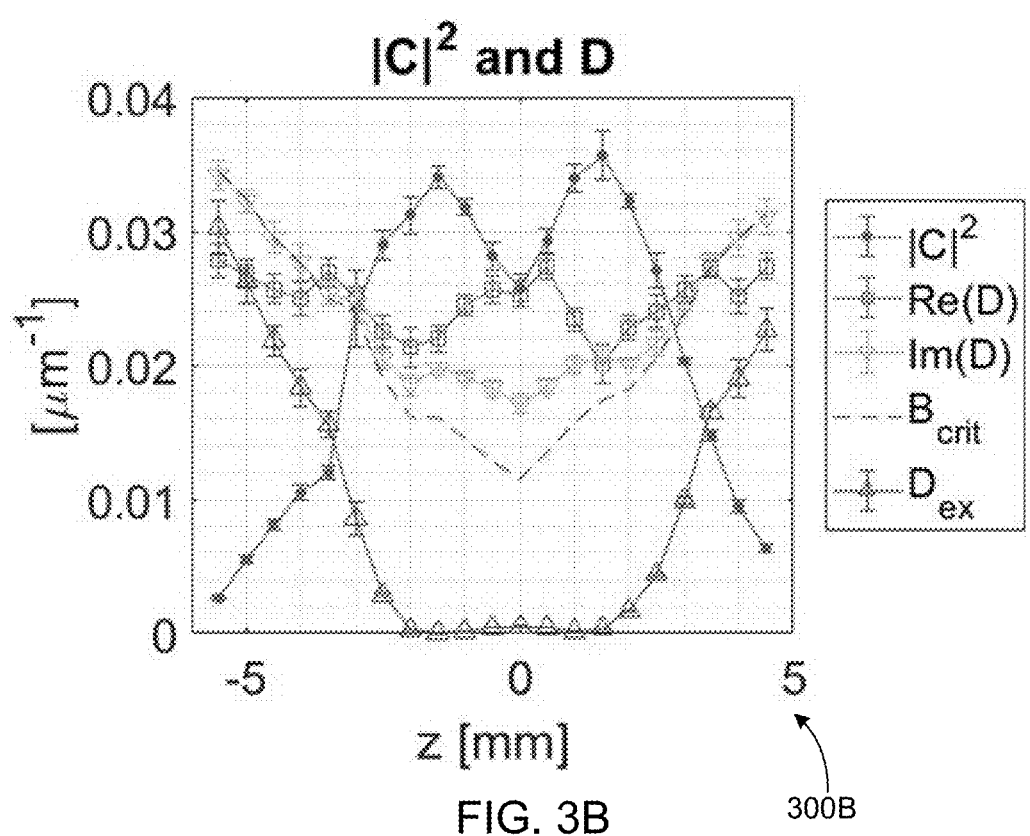
FIG. 3B graphically depicts quantities including: the coupling strength, central wavelength shift, resonance broadening, critical coupling bound, and excess resonant loss, as a function of WG taper axis position z for a WG/resonator system as illustrated in FIG. 1.

FIG. 3B graphically depicts coupling strength as a function of WG taper axis position z, specifically the coupling strength $|C|^2$, the real and imaginary parts of D (the local shift of the resonance frequency and loss-induced broadening, respectively) as a function of WG taper axis position z, with the critical coupling bound $B_{crit}$ (such as per Eq. (5)) and the excess resonant loss $D_{ex}$ (such as per Eq. (6)). It is noted that the data of FIG. 3B provides a map enabling the positioning of the WG/resonator devices to achieve a desired criticality level.

Generally speaking, the various embodiments contemplate a series of actions culminating in the determination of various parameters and, optionally, the generation of a parameter space map, such as may be represented as shown in FIGS. 3A-3B. The various embodiments gather or receive measurement data associated with a waveguide/resonator coupling of interest, use the measurement data to create a spectrogram, and use the spectrogram to estimate resonator parameters and coupling parameters. With respect to resonator parameters, the mode structure of the resonator is determined by isolating in a particular wavelength/frequency range a set of axial modes, determining the relative spacing between the modes, and using the edges of the spectra/resonances in order to determine the resonator parameters that give rise to the correct bare Green's functions for each spectrogram.

Figure 2B:
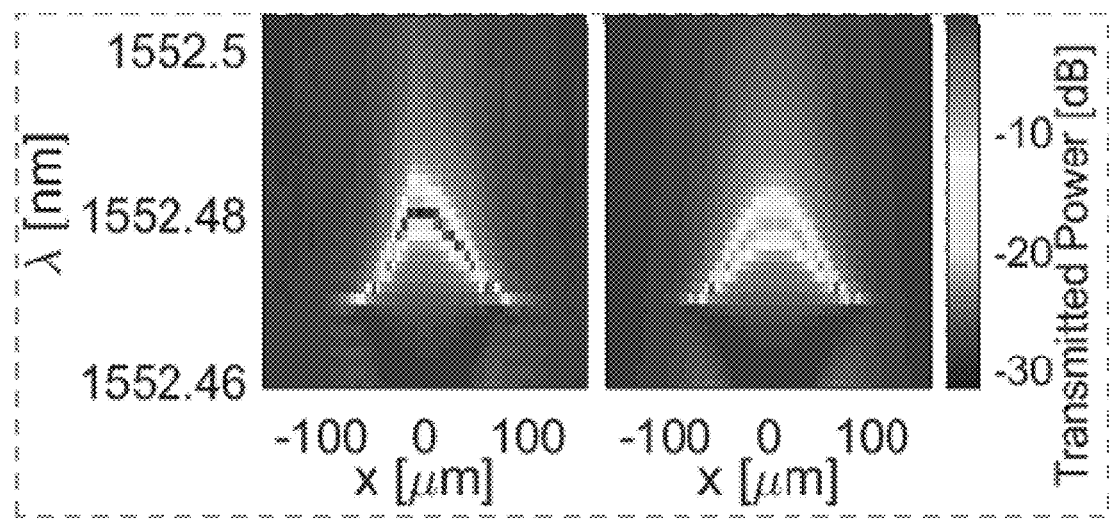
FIG. 2B depicts magnified portions of the fundamental axial resonance from 2D measured and best-fit model spectrograms of FIG. 2A.
Figure 2C:
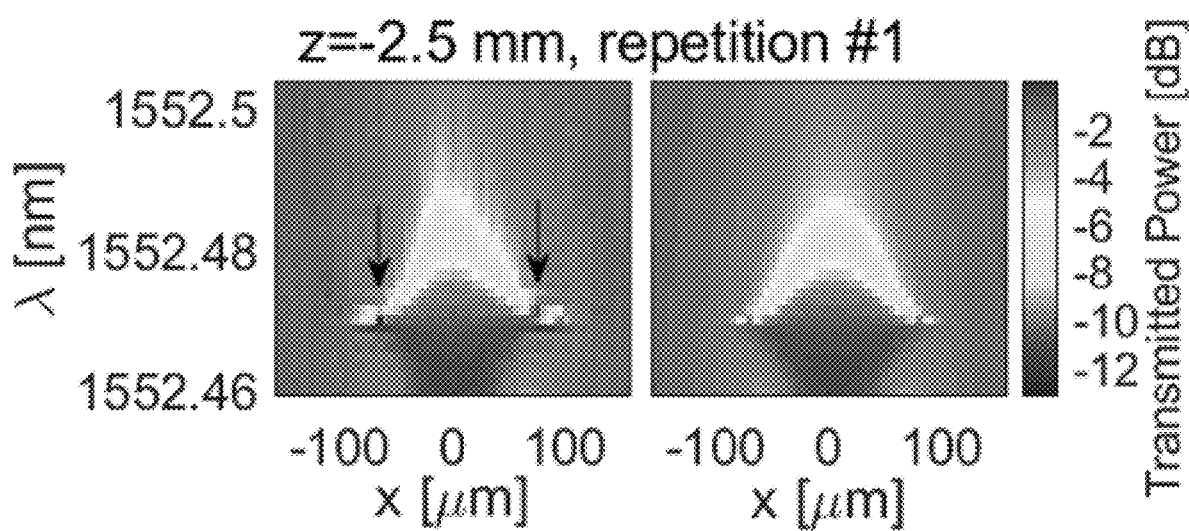
FIG. 2C depicts magnified portions of the fundamental axial resonance from 2D measured and best-fit model from a spectrogram measured at a different z position where coupling is in the overcoupled regime.

It is noted that the coupling to the waveguide will shift as the waveguide is moved (position translated) across the resonator (i.e., a position dependent shift of the frequency), and the bare resonant spectrum of the resonator is determined by finding the wavelength/frequency of each axial mode at the outermost edge positions of each mode along x where there is little or no shift (see FIGS. 2A and 2B).

After determining the wavelength of the fundamental mode (resonant mode) on the side of the indicated spectral portion in the box (i.e., the top spectral component in the spectrograms shown, which exhibits the longest wavelength), the wavelength determining process is repeated for each of the other resonances indicated in the spectrogram. In this manner, the resonance structure of the resonator is determined.

Next, a resonator parameters model is generated to fit the resonance structure determined using the measured data. Specifically, a first fitting is performed to determine a "best" set of resonator parameters that reconstructs the bare spectrum of the resonator determined using measured data.

Various embodiments contemplate this first fit as being conducted substantially in accordance with an assumed model, such as provided via Eq. (3). Specifically, Eq. (3) assumes a super-Gaussian model as the particular functional form of the effective radius variation (i.e., the potential describing the exemplary resonator). A fitting process is performed using Eq. (3) as an input to the mode solving computing module along with the determined bare axial resonant spectrum to extract therefrom the resonator parameters A, $\sigma$, p, $x_0$, and K, and equivalently, through solving the 1D Schrödinger equation using mode solving hardware/software, determining the bare Green's functions $G(\lambda,x,x)$.

By finding the parameters that describe the resonator measurements, a model of a resonator that would produce these measurements may be determined (i.e., the "best" set of parameters to describe the actual results). Once the resonator parameters are determined, they are held (fixed in place).

A second (different) fitting method is used to determine the coupling parameters. Specifically, having determined the resonator parameters and bare Green's functions $G(\lambda,x,x)$, the coupling parameters $|S_0(z)|^2$, $\arg[S_0(z)]$, $|C(z)|^2$, $\text{Re}[D(z)]$, and $\text{Im}[(z)]$ may now be determined. The second fitting method is performed on the spectrogram data using Eq. (1) to determine the coupling parameters that reproduce the spectrogram P.

The various fitting methods may be implemented using a computing device such as depicted below with respect to FIG. 5.

Various embodiments include modules configured to compensate for thermal drift and the like (e.g., typically manifested as a tilt in the spectrographic representation of the measured data). Thermal drift may be compensated for during the processing of measurement data, such as via the computing device 501 of the system 500 of FIG. 5.

It is noted that in equation 1, when considering the transmission spectrum of the device, the coupling parameters for a spectrogram do not depend upon x, but they do depend upon the position parameter z. Selecting a particular z to use thus selects a particular set of coupling parameters.

Various embodiments contemplate the generation of a map having two or more waveguides. For example, with two waveguides denoted $WG_1$ and $WG_2$, each has their own x and z parameters, denoted with subscripts $x_j$ and $z_j$ where j={1,2}. In these embodiments, a first WG with a first z parameter is characterized thru coupling with the resonator to provide a first data set of spectrograms and coupling characterization analysis, ultimately leading to a first parameter space map, after which a second WG with a second z parameter is processed with the resonator to provide second data sets etc. ultimately leading to a second parameter space map. Further, more than two WGs (with respective and potentially even overlapping z parameters) may be processed individually to provide multiple sets of coupling parameters (the bare resonator modes $G(\lambda,x,x)$ remain the same as the resonator is unchanged). That is, compound structures such as with more that two components (e.g., $WG_1$/Resonator/$WG_2$) may also have parameter maps extracted therefrom in accordance with the disclosed embodiments.

Figure 3C:
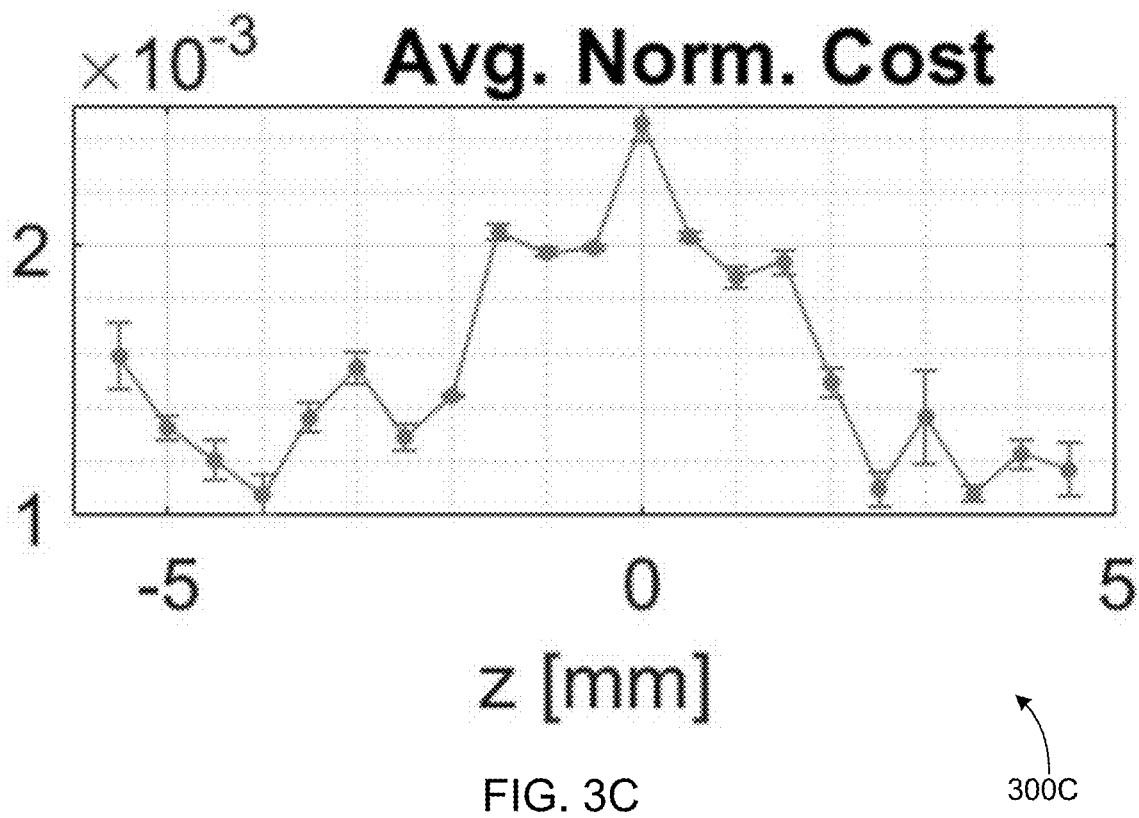
FIG. 3C graphically depicts normalized average cost as a function of WG taper axis position z for a WG/resonator system as illustrated in FIG. 1.

FIG. 3C graphically depicts normalized average cost as a function of WG taper axis position z. Specifically, it can be seen by inspection that the normalized average cost (e.g., such as described above proximate Eq. (4)) is indicative of excellent agreement between model and theory.

Figure 3D:
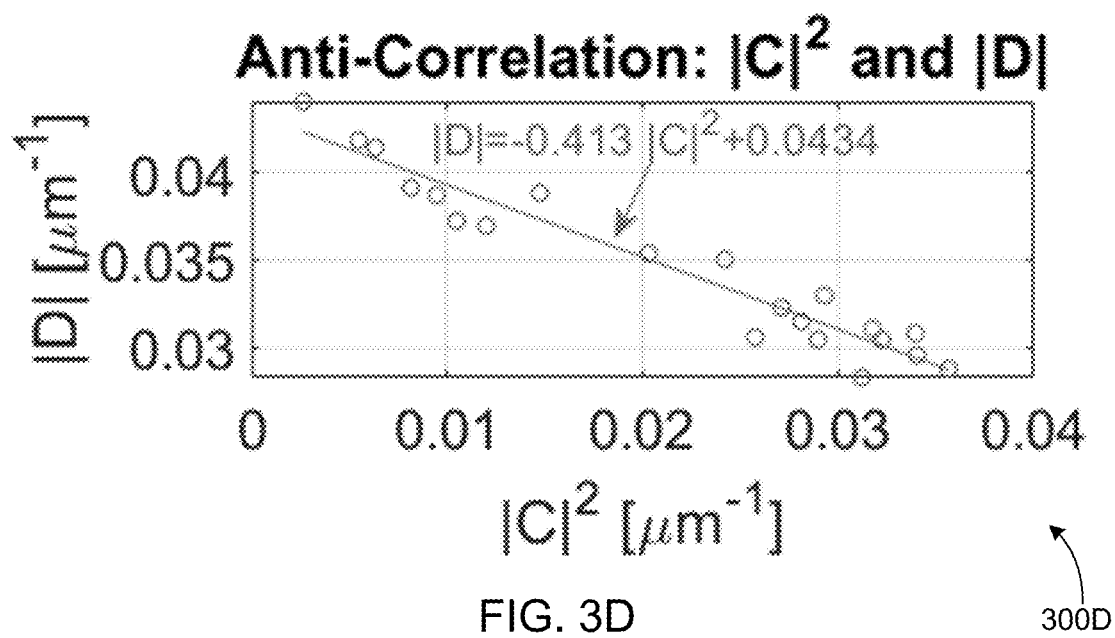
FIG. 3D graphically depicts average values of $|C|^2$ and IDI display anti-correlation for the WG/resonator of FIG. 1.

FIG. 3D graphically depicts that the average values of $|C|^2$ and $|D|$ display anti-correlation. It can be seen by inspection that a best-fit line approximately describes a relationship where stronger coupling is associated with smaller effect of the waveguide on the cavity |D|.

Characterization of the local coupling parameters yields rich information about coupling variation as the resonator is moved to vary the position along the taper axis z. It can be seen by inspection of FIG. 3A that the nonresonant power transmission $|S_0|^2$ has slope transitions at $z=\pm 3$ mm and a mimimum value near the center of the taper waist region at $z=0$ mm. The phase $\arg(S_0)$ is nearly flat across the entire measured z range. It can be seen by inspection of FIG. 3B that coupling strength $|C|^2$ peaks at $z=\pm 1.5$ mm. $\text{Re}(D)$ has a roughly flat profile with random variation, indicating that the phase shift experienced by WGMs passing the microfiber is roughly independent of the microfiber diameter. The resonant loss $\text{Im}(D)$ is smallest in the central taper waist region but increases with the local taper radius away from this region (as discussed further with respect to $D_{ex}$).

In some cases, the coupling parameter fits can converge to local minima that don't represent the actual coupling parameters. The embodiments determine when this occurs by comparing the best-fit model and experimental transmission amplitudes $$S_{11}(\lambda, x, z) = S_0(z) - \frac{i|C(z)|^2 G(\lambda, x, x)}{1 + D(z)G(\lambda, x, x)}.$$

These two quantities are substantially different for local minima, and such a difference indicates that the fit must be run again with the local minima excluded, or with starting values closer to the true values.

The excellent agreement of our best-fit model and measured spectrograms is apparent from the low normalized cost [FIG. 3(c)]

$$\overline{\Delta P}(z) = \frac{\sqrt{\sum_{i,j} [P_{meas}(\lambda_i, x_j, z) - P_{model}(\lambda_i, x_j, z)]^2}}{HN}, \quad (4)$$

where $P_{meas}$ and $P_{model}$ are the measured and best-fit model transmission [Eq. (1)], i and j index grid positions, the numerator is the cost value, and the denominator normalizes the cost by N, the number of transmission values in the fit region box in FIG. 2A; the model has the same number of transmission values as the measured spectrograms, and H, the depth of the measured fundamental axial resonance along its central position (x=0). This quantifies the fractional variation per measured transmission value. The effectiveness of the local approach is validated by the small value of $\overline{\Delta P}(z)$ across the entire profile.

Microresonator-taper coupling can be sorted into three coupling regimes, set by the ratio of the light loss rate from the microresonator and the coupling rate between the microresonator and taper. The local coupling parameters determine the coupling regime. Critical coupling occurs when $|C(z)|^2$ equals the criticality bound $$B_{crit}(z) = \frac{|S_0(z)|^2 \text{Im}[D(z)]}{\text{Re}[s_0(z)]}. \quad (5)$$

The resonator-taper system is in the overcoupled regime when $|C(z)|^2 > B_{crit}(z)$, and in the undercoupled regime when $|C(z)|^2 < B_{crit}(z)$. This relationship also implies that the local group delay of individual axial modes is positive (negative) in the overcoupled (undercoupled) regime. This also implies that the group delay has a particular value in various regimes.

Where $|z|>3.0$ mm in FIG. 3B, the system is undercoupled and $B_{crit}(z) \approx \text{Im}[D(z)]$. At $z=\pm 3.0$ mm, the power transmission for resonant light is very small (<2% for $z=+3.0$ mm; even smaller for $z=-3.0$ mm [FIG. 2A]). This and the nearby crossings of $B_{crit}(z)$ and $|C(z)|^2$ both indicate that coupling is close to critical at these positions. Between these critical coupling positions, the system is overcoupled and it's important to perform the check described above against local minima. The transmission is very sensitive to small changes in overcoupled and critically-coupled configurations, and since the embodiments system do not use feedback stabilization, a concomitant increase in the standard deviation of $|C|^2$ in those regimes may be noted. It is further noted that the dips near the edges of the resonances in spectrograms such as depicted in FIG. 2C are indicative of overcoupling. The increased variation in these dips can confound the fit, which is why the embodiments select the fit-region such as indicated in FIG. 2A.

The coupling parameters indicate device loss performance. Energy conservation sets two constraints on the coupling parameters:

$$|S_0(z)| < 1 \text{ AND } \text{Im}[D(z)] > |C(z)|^2 \frac{1 - \text{Re}[S_0(z)]}{1 - |S_0(z)|^2}, \quad (6)$$

which set bounds on the nonresonant and resonant loss, respectively. Minimum loss occurs when each of these conditions approaches equality. The embodiments quantify how much $\text{Im}[D(z)]$ exceeds this minimum with the excess resonant loss, as follows:

$$D_{ex}(z) = \text{Im}[D(z)] - |C(z)|^2 \frac{1 - \text{Re}[S_0(z)]}{1 - |S_0(z)|^2}. \quad (7)$$

Investigation of the suggested proportionality relationship between the excess loss and the local radius of the microfiber at the point of contact is an interesting avenue for future research that could potentially be used to determine the microfiber radius variation (see e.g. [28]). We find a strong anti-correlation relationship between $|C|^2$ and $|D|$ (correlation coefficient=−0.96) [FIG. 3(d)], which indicates that the taper's effect on the cavity field (through resonant frequency shifts and induced loss) is smallest where the coupling is largest.

That is, some embodiments determine whether local minima exist, such as by comparing/analyzing the best fit parameters that can be plotted (e.g., transmission spectrogram, transmission amplitude, etc.). The embodiments process the data to ensure that the measured values and the best fit reconstructed model agree with each other. If there are local minima that do not agree, then at least portions of the methods described herein are re-executed with different initial values for fit parameters.

In some embodiments, to reduce the possibility of local minima, a transmission amplitude fit is first performed to find starting parameters useful for the transmission fit.

Target System Design/Configuration

Once the fit parameters (coupling and resonator) are determined, consideration of target system design and configuration may be desired (e.g., a critical coupling or other design goal). This may be readily achieved using the now-mapped coupling parameter space and resonator parameter space. Since the parameter space is mapped out, the values associated with each location are known, therefor easier to set up a configuration of WG/resonator to achieve a desired purpose per application/system. The parameter space map provides all that is needed to position WG/resonator to achieve some purpose (undercoupled, critically coupled, overcoupled, and so on).

Critical coupling is frequently used in communications systems. Specifically, where it is desirable to set up the waveguide with respect to the resonator such that there is interference operative to stop all of the light that would transmit through the waveguide and past the resonator; that is the light that coming back through the resonator destructively interferes with light passing through the waveguide so that almost all of the light is sent into the resonator and little or no light is transmitted through the waveguide.

A first step is to understand the parameters such that the devices may be arranged in a manner that provides the desired critical coupling. Further, this embodiment may be extended to include a second waveguide at the end of the resonator.

In addition to determining the coupling parameters, the various embodiments also enable determining or extracting the resonator parameters (spectrum of the resonator).

The embodiments provide a mechanism for experimentally measuring the various parameters associated with a coupled waveguide resonator pair to enable, for example, subsequent decisions about particular coupling configurations that might be useful in a particular application. In this manner, a broad class of devices/applications may be enabled, such as with respect to specific non-zero loss minimization.

That is, characterizing the coupling parameters there provide an indication of the loss performance associated with each of several different couplings for a particular WG/resonator pair such that loss related criteria may be understood within the context of using this WG/resonator pair within a larger application or system (e.g., so as to minimize loss within the application or system). This is relevant to applications including filters and delay lines at very specific frequencies, Loss minimization as well as loss optimization may be accurately controlled. For example, having characterized the coupling parameters (optionally the resonator parameters), the behavior of a particular WG/resonator pair within an application or larger system may be advantageously used to perform various functions such as impedance matching the like. A specific or target amount of loss is often desired.

The waveguide is physically translated with respect to the resonator or vice versa enables the retrieval of spectral data useful in determining or characterizing the coupling parameters and the resonator parameters. The various embodiments provide a measurement methodology which inherently extracts an enormous amount of raw characterization-related data from the WG/resonator pair. As such, various embodiments employed mechanisms to efficiently reduce the problem space represented by the enormous amount of characterization-related data so as to efficiently derive therefrom useful characterization information pertaining to the coupling parameters of the WG/resonator pair, and if desired the resonator itself.

Figure 4:
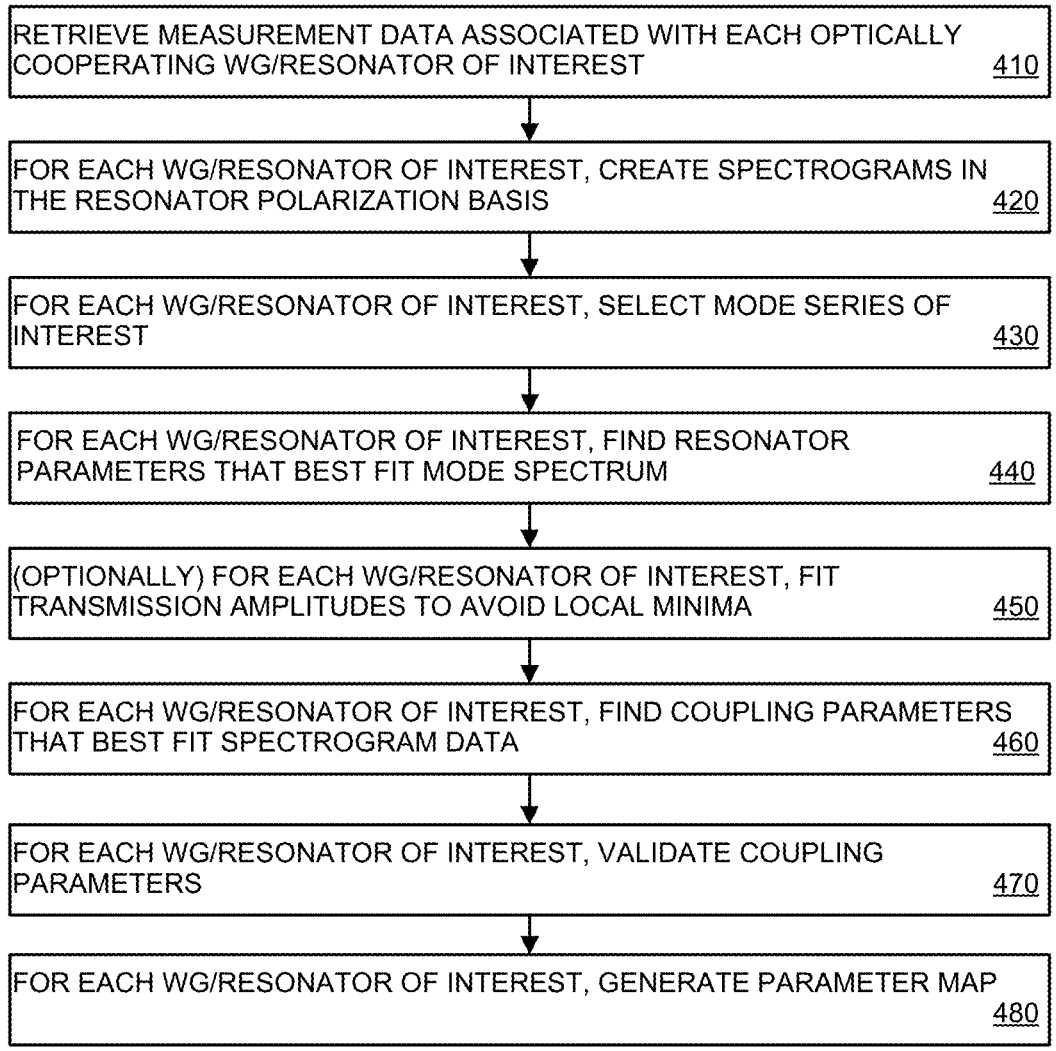
FIG. 4 depicts a flow diagram of a method according to an embodiment.

FIG. 4 depicts a flow diagram of a method according to an embodiment. Specifically, FIG. 4 depicts a method 400 of determining resonant and coupling parameters (parameter maps) in accordance with various embodiments discussed herein.

At step 410, measurement data associated with each optically cooperating WG/resonator of interest is retrieved as discussed above. For example, as discussed above, a single WG/resonator pair may be of interest, multiple WG/resonator pairs may be of interest (e.g. WG/resonator/WG) and so on.

At step 420, for each optically cooperating WG/resonator of interest, spectrograms in the resonator polarization basis are created, as discussed above.

At step 430, for each optically cooperating WG/resonator of interest, mode series of interest are selected, as discussed above.

At step 440, for each optically cooperating WG/resonator of interest, the resonator parameters that best fit the selected mode series spectrum are found, as discussed above.

At optional step 450, for each optically cooperating WG/resonator of interest, transmission amplitudes that avoid local minima are fit.

At step 460, for each optically cooperating WG/resonator of interest, the coupling parameters that best fit the spectrogram data are found, as discussed above.

At step 470, for each optically cooperating WG/resonator of interest, the coupling parameters are validated, as discussed above.

At step 480, for each optically cooperating WG/resonator of interest, the various parameters are determined, optionally for generating a corresponding parameter map, as discussed above.

Figure 5:
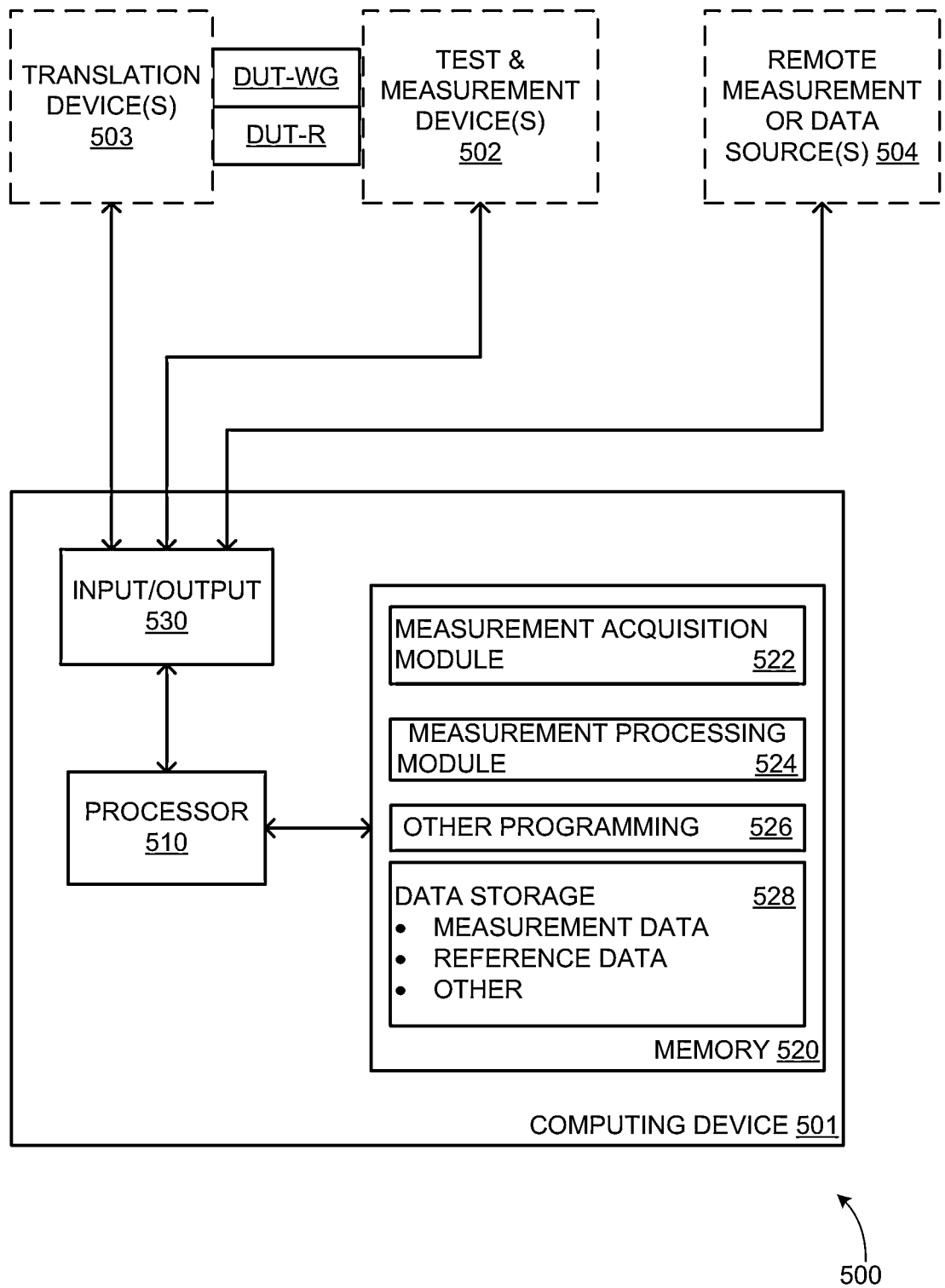
FIG. 5 depicts a computing device suitable for implementing processing functions in accordance with the various embodiments.

FIG. 5 depicts a simplified block diagram of a system suitable for implementing the various embodiments. Specifically, the system 500 of FIG. 5 is suitable for use in implementing the various functions described above with respect to FIGS. 1-4.

The system 500 of FIG. 5 is depicted as including a computing device 501 suitable for processing measurement data associated with a resonator and one or more waveguides as discussed above with respect to FIGS. 1-4.

As depicted in FIG. 5, the system 500 is used to process measurement information (e.g., optical characteristics, spectrogram data, Jones matrix spectrum, etc. as discussed herein) associated with or retrieved from two devices under test (DUT), such as a waveguide (DUT-WG) and a resonator (DUT-R). More of fewer WGs and/or resonators may be processed in accordance with the various embodiments, such as in the case of a resonator coupled to more than one WG, a sequence of resonators and WGs, and/or any combination thereof.

The system 500 is further depicted as including various optional devices; namely, test and measurement device(s) 502 and translation device(s) 503. The test and measurement device(s) 502 may be configured to measure various parameters of the DUT such as described above. That is, the test and measurement device(s) 502 may be configured to measure optical parameters of a coupled waveguide and resonator and to derive thereby corresponding measurement data which may be provided to the computing device for processing as discussed herein.

The translation device(s) 503 may be used to adjust the positions of the DUT with respect to each other such that the parameters may be measured at multiple points of interest, such as described above. That is, the translation device(s) 503 may be configured for adjusting relative positions of a coupled waveguide and resonator so as to enable optical parameter measurements at the multiple contact positions or points of interest as discussed herein.

The system 500 is further depicted as including optional alternate/remote measurement or data source(s) 504, which may comprise an alternate or remotely located test and measurement device(s) tasked with performing some or all of the various measurements on DUT, alternate or remotely located data source(s) storing some or all of the DUT measurement information (or characterization information such as for particular resonators that have been previously processed), and/or a combination thereof.

The computing device 501 comprises one or more processor(s) 510, a memory 520, and input/output (I/O) circuitry 230.

The processor(s) 210 is coupled to, and adapted to cooperate with, the memory 220, the I/O circuitry 230, and various other modules or support circuitry (not shown) to provide the various functions as described herein with respect to the various embodiments.

Memory 220 includes random access memory (RAM), read only memory (ROM), and/or flash memory, and stores information in the form of data and instructions. These instructions that can be executed by processor(s) 210. Various types of data and instructions may be stored in memory 220.

The memory 220, generally speaking, stores programs, data, tools and the like that are adapted for use in providing various functions as described herein with respect to the figures. For example, the memory 220 is depicted as storing instructions associated with a measurement acquisition module 522, a measurement processing module 524, other programming 526, as well as data storage 528 (including storage for measurement data, spectral information, intermediate and final processing parameters, coupling parameters, resonator parameters, parameter space map(s), and various other information), which instructions cause the respective modules either individually or in combination to perform the various functions of the embodiments described herein. The memory 220 stores instructions controlling the transmission and reception of any control information or data between the computing device 501, test and measurement device(s) 502, translation device(s) 503, and/or alternate/remote measurement or data source(s) 504 in accordance with appropriate communications protocols, data and control formats, timing requirements, packet structures and the like.

In communication networks based on classical physics, loss may be compensated for with amplifiers. In communications that use quantum light, amplification is forbidden by the No Cloning theorem. Thus, device loss performance requirements are much more stringent. The coupling configuration plays an important role in loss performance and must be characterized in actual devices to ensure they function as desired.

Ultralow loss optical devices such as the switches and buffers mentioned above could be combined with optical fibers to make networks capable of handling quantum light to make a quantum network, which is an area of substantial scientific interest believed to offer unique information processing capabilities. For example, the ability to route entangled photons could enable creation of an entanglement distribution network that generates entanglement between end users on demand. Entanglement is a resource that would enable those end users to accomplish a variety of quantum information processing tasks, such as distributed quantum computation or sensing. Note that high-performance optical devices suitable for quantum information networks would also be useful in classical communication contexts. Furthermore, the capabilities for directing and manipulating light could be deployed as a service to end users Described herein are an experimental characterization of local coupling parameters which describe the interaction between an exemplary resonator and waveguide, illustratively an elongated bottle microresonator and an input-output microfiber. In contrast to parameters commonly used for the description of the microresonator-waveguide coupling, these parameters are independent of the mode distribution. The fitting approach of the embodiments demonstrates excellent agreement between measured and best-fit theoretical models, in addition to good coupling parameter repeatability between consecutive spectrogram measurements, in all coupling regimes (undercoupled, critically coupled, and overcoupled).

Various embodiments provide methods for characterizing coupling and loss, so as to enable design optimization towards classical and quantum resonant optical devices. The elongated shape of the modes is of special importance since it enables simplified positioning of quantum emitters. For this purpose, the microresonator profile can be optimized to arrive at enhanced regions with uniform WGM magnitude. It is further noted that this above-described embodiments can be generalized to find local coupling parameters with any microresonator system where $w \ll x_c$, through substitution of mode-solving methods appropriate to the resonator in use. Such generalization enables investigation across multiple WGM resonator platforms to generate insight into commonalities and differences in their coupling behavior.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of determining evanescent coupling parameters of a waveguide coupled to a resonator, the waveguide configured to provide a field having a length scale w that is smaller than a characteristic length $x_c$ of a field of the resonator, the method comprising:

responsive to data indicative of a Jones matrix spectrum of the coupled waveguide and resonator at each of multiple contact positions x along the resonator with fixed z, calculating a transmission spectrum of the coupled waveguide and resonator at each of the multiple contact positions x;

generating a 2D spectrogram by combining the calculated transmission spectrum of the coupled waveguide and resonator at each of the multiple contact positions x;

estimating resonator parameters by fitting a resonator model to a 1D axial resonance spectrum derived from the 2D spectrogram;

fitting a coupled WG/resonator model to a subset of 2D spectrogram data to estimate coupling parameters using estimated resonator parameters.

2. The method of claim 1, wherein data indicative of a Jones matrix spectrum comprises a data set including jones matrix spectrum of the coupled waveguide and resonator processed to exclude loss in tapered regions and isolation of the polarization basis of the resonator.

3. The method of claim 1, further comprising:

responsive to data indicative of a Jones matrix spectrum of the coupled waveguide and resonator at each of multiple contact positions x along the resonator for at least one additional fixed z, calculating a transmission spectrum of the coupled waveguide and resonator at each of the multiple contact positions x for each of the at least one additional fixed z.

4. The method of claim 1, further comprising fitting a resonator model to the measured spectrogram data to determine thereby the resonator parameters.

5. The method of claim 1, wherein the coupled WG/resonator model conforms to the following equation:

$$P(\lambda, x, z) = \left| S_0(z) - \frac{i|C(z)|^2 G(\lambda, x, x)}{1 + D(z)G(\lambda, x, x)} \right|^2$$

where $\lambda$ is the vacuum wavelength, $S_0(z)$, $|C(z)|^2$ and $D(z)$ are local coupling parameters, and $G(\lambda,x,x)$ is the Green's function of the one-dimensional wave equation describing the propagation of WGMs along a bottle resonator axis x.

6. The method of claim 5, wherein the resonator model conforms to the following equation:

$$\Delta r_{eff}(x) = A \exp\left[-\left(\frac{(x-x_0)^2}{2\sigma^2}\right)^p\right] + K.$$

whereby said $\Delta r_{eff}$ is the effective radius variation from the fiber x axis while taking into account the change in refractive index also along the fiber x axis.

7. The method of claim 1, wherein the Jones matrix spectral data of the coupled waveguide and resonator is received from an Optical Vector Analyzer (OVA) operatively cooperating with the coupled waveguide and resonator, and the Jones matrix spectrum of the resonator-waveguide system is derived from said data using Jones matrix diagonalization and taper loss compensation.

8. The method of claim 1, wherein the data indicative of a Jones matrix spectrum of the coupled waveguide and resonator is limited for coupling parameter fitting to a subset of the multiple contact positions x and wavelengths, the subset being defined to include positions between characteristic edge-dips present in an overcoupling regime and a wavelength range including a fundamental axial resonance and excluding additional axial resonances.

9. The method of claim 1, wherein the waveguide comprises a microfiber waveguide, and the resonator comprises an elongated bottle microresonator.

10. A method for characterizing evanescent coupling parameters of a waveguide optically cooperating with a resonator, the waveguide configured to provide a field having a length scale w that is smaller than a characteristic length $x_c$ of a field of the resonator, the method comprising:

using a plurality of measurements of the optically cooperating WG/resonator, generating a spectrogram in the resonator polarization basis, the measurements taken at a respective contact positions x along the resonator with fixed z;

determining resonator parameters that best fit a mode series spectrum of a mode series of interest; and determining coupling parameters that best fit the generated spectrogram.

11. System for characterizing evanescent coupling parameters of a waveguide coupled to a resonator, the waveguide configured to provide a field having a length scale w that is smaller than a characteristic length $x_c$ of a field of the resonator, the system comprising a computing device configured for:

responsive to data indicative of a Jones matrix spectrum of the coupled waveguide and resonator at each of multiple contact positions x along the resonator with fixed z, calculating a transmission spectrum of the coupled waveguide and resonator at each of the multiple contact positions x;

generating a 2D spectrogram by combining the calculated transmission spectrum of the coupled waveguide and resonator at each of the multiple contact positions x;

estimating resonator parameters by fitting a resonator model to a 1D axial resonance spectrum derived from the 2D spectrogram;

fitting a coupled WG/resonator model to a subset of 2D spectrogram data to estimate coupling parameters using estimated resonator parameters.

12. The system of claim 11, further comprising a measurement device configured to measure optical parameters of the coupled waveguide and resonator and to provide corresponding measurement data to the computing device.

13. The system of claim 12, wherein the computing device is further configured for adjusting relative positions of the coupled waveguide and resonator so as to enable optical parameter measurements at the multiple contact positions x.

14. The system of claim 12, wherein the computing device is further configured for fitting a resonator model to the measured spectrogram data to determine thereby the resonator parameters.

15. The system of claim 12, wherein the coupled WG/resonator model conforms to the following equation:

$$P(\lambda, x, z) = \left| S_0(z) - \frac{i|C(z)|^2 G(\lambda, x, x)}{1 + D(z)G(\lambda, x, x)} \right|^2$$

where $\lambda$ is the vacuum wavelength, $S_0(z)$, $|C(z)|^2$ and $D(z)$ are local coupling parameters, and $G(\lambda,x,x)$ is the Green's function of the one-dimensional wave equation describing the propagation of WGMs along a bottle resonator axis x.

16. The system of claim 15, wherein the resonator model conforms to the following equation:

$$\Delta r_{eff}(x) = A \exp\left[-\left(\frac{(x-x_0)^2}{2\sigma^2}\right)^p\right] + K.$$

whereby said $\Delta r_{\mathit{eff}}$ is the effective radius variation from the fiber x axis while taking into account the change in refractive index also along the fiber x axis.

17. The system of claim 12, wherein the Jones matrix spectral data of the coupled waveguide and resonator is received from an Optical Vector Analyzer (OVA) operatively cooperating with the coupled waveguide and resonator, and the Jones matrix spectrum of the resonator-waveguide system is derived from said data using Jones matrix diagonalization and taper loss compensation.

18. The system of claim 12, wherein the data indicative of Jones matrix spectrum of the coupled waveguide and resonator is limited to a subset of the multiple contact positions x and wavelengths, the subset being defined to include positions between characteristic edge-dips present in an overcoupling regime and a wavelength range including a fundamental axial resonance and excluding additional axial resonances.

19. The system of claim 12, wherein the waveguide comprises a microfiber waveguide, and the resonator comprises an elongated bottle microresonator.

20. The system of claim 11, wherein the data indicative of a Jones matrix spectrum of the coupled waveguide and resonator is limited for coupling parameter fitting to a subset of the multiple contact positions x and wavelengths, the subset being defined to include positions between characteristic edge-dips present in an overcoupling regime and a wavelength range including a fundamental axial resonance and excluding additional axial resonances.

\* \* \* \* \*